(12) United States Patent
Fukui

(10) Patent No.: US 11,446,694 B2
(45) Date of Patent: Sep. 20, 2022

(54) PIPE CONNECTING JIG AND ESI SPRAYER

(71) Applicant: Shimadzu Corporation, Kyoto (JP)

(72) Inventor: Wataru Fukui, Kyoto (JP)

(73) Assignee: SHIMADZU CORPORATION, Kyotoshi (JP)

(*) Notice: Subject to any disclaimer, the term of this patent is extended or adjusted under 35 U.S.C. 154(b) by 261 days.

(21) Appl. No.: 16/641,019

(22) PCT Filed: Sep. 14, 2017

(86) PCT No.: PCT/JP2017/033296
§ 371 (c)(1),
(2) Date: Feb. 21, 2020

(87) PCT Pub. No.: WO2019/053849
PCT Pub. Date: Mar. 21, 2019

(65) Prior Publication Data
US 2021/0146395 A1    May 20, 2021

(51) Int. Cl.
*B05B 15/65* (2018.01)
*G01N 30/72* (2006.01)
(Continued)

(52) U.S. Cl.
CPC ............... *B05B 15/65* (2018.02); *B05B 5/16* (2013.01); *G01N 30/7266* (2013.01);
(Continued)

(58) Field of Classification Search
CPC ........ B05B 15/65; B05B 5/16; G01N 30/724; G01N 30/7266; H01J 49/165; H01J 49/167
See application file for complete search history.

(56) References Cited

U.S. PATENT DOCUMENTS 5,572,023 A    11/1996  Caprioli
6,140,640 A    10/2000  Wittmer et al.
(Continued)

FOREIGN PATENT DOCUMENTS

EP    1636823 A2    3/2006
JP    2006-153603 A    6/2006
(Continued)

OTHER PUBLICATIONS

English translation of International Search Report dated Dec. 19, 2017 issued in corresponding PCT Application PCT/JP2017/033296.
(Continued)

*Primary Examiner* — David E Smith
(74) *Attorney, Agent, or Firm* — Norton Rose Fulbright US LLP

(57) ABSTRACT

In an ESI sprayer including a pipe connecting jig used to connect an inlet-side pipe and an ESI capillary, a through-hole having an inner diameter corresponding to an outer diameter of the inlet-side pipe at one end and an inner diameter corresponding to an outer diameter of the ESI capillary at another end is formed in an axial direction of a conductive cylindrical body in which at least both ends are plastically deformable, and a gap forming protrusion protruding inward from a circumferential wall of the through-hole is provided in the cylindrical body.

8 Claims, 4 Drawing Sheets

(51) Int. Cl.
*H01J 49/16* (2006.01)
*B05B 5/16* (2006.01)

(52) U.S. Cl.
CPC .......... *H01J 49/165* (2013.01); *H01J 49/167* (2013.01); *G01N 30/724* (2013.01)

(56) References Cited

U.S. PATENT DOCUMENTS

| | | | |
|---|---|---|---|
| 2002/0011561 A1 | 1/2002 | Park | |
| 2005/0023455 A1* | 2/2005 | Bailey | H01J 49/165 250/288 |
| 2007/0164562 A1* | 7/2007 | Valaskovic | G02B 6/3809 285/245 |
| 2013/0009055 A1* | 1/2013 | Zhu | H01J 49/16 250/288 |

FOREIGN PATENT DOCUMENTS

| | | |
|---|---|---|
| JP | 2007-511746 A | 5/2007 |
| JP | 2015-014616 A | 1/2015 |
| JP | 2015014616 A * | 1/2015 |
| JP | 2017-036809 A | 2/2017 |
| JP | 2017036809 A * | 2/2017 |
| WO | 2005/042127 A2 | 5/2005 |

OTHER PUBLICATIONS

Web page, "Connector Adapter Union" of MS Equipment Co., Ltd. (Search on Aug. 9, 2017), with partial English texts. Retrieved from the Internet, URL: http://www.technosauras.co.jp/categories/view/194 on Oct. 30, 2019.

Written Opinion of the International Search Authority (ISA237) dated Dec. 19, 2017 with its machine translation issued for PCT/JP2017/033296.

* cited by examiner

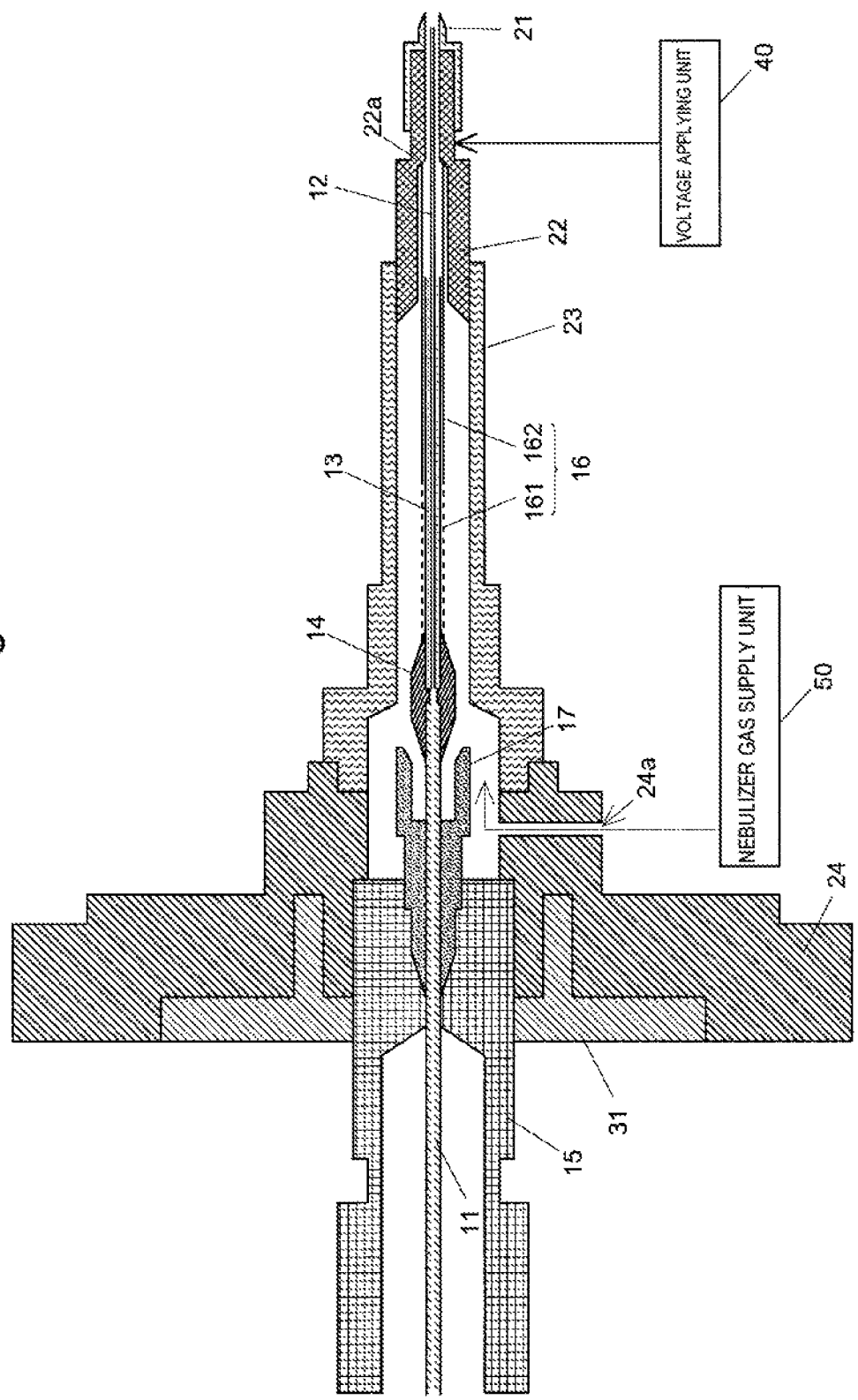

PIPE CONNECTING JIG AND ESI SPRAYER

CROSS-REFERENCE TO RELATED APPLICATIONS

The present application is the national stage of International Pat. App. No. PCT/JP2017/033296 filed Sep. 14, 2017, the content of which is incorporated herein by reference in its entirety.

FIELD OF THE INVENTION

The present invention relates to an ESI sprayer including a pipe connecting jig that connects two pipes made of an insulator.

BACKGROUND

A liquid chromatograph is widely used as an apparatus that analyzes a component contained in a liquid sample. In the liquid chromatograph, the liquid sample is introduced into a column on a flow of a mobile phase, and various components contained in the liquid sample are temporally separated, and measured with a detector. The liquid chromatograph including a mass spectrometer as the detector is called a liquid chromatograph mass spectrometer. In the liquid chromatograph mass spectrometer, various components sequentially eluted from a column of a liquid chromatograph are ionized by introducing the various components into the ion source of the mass spectrometer, and the generated ions are measured in each mass-to-charge ratio.

One of ionization methods used in the liquid chromatograph mass spectrometer is an electrospray ionization (ESI) method, in which various components are ionized by charging an eluate from the column of the liquid chromatograph and spraying the charged elute in the ionization chamber. In the ESI method, the eluate is introduced into the ESI sprayer to which a high voltage is applied and charged, and a nebulizer gas is sprayed on the charged eluate at a leading end of the ESI sprayer and sprayed and ionized in the ionization chamber.

Recently, in the liquid chromatograph mass spectrometer, so-called nano-ESI or micro-ESI is widely used to measure a very small amount of component contained in a sample with high sensitivity. In the nano-ESI or the micro-ESI, a small-diameter column is used, and the amount of eluate per unit time introduced into the ESI sprayer is reduced by controlling the flow rate of the mobile phase from a nL/min level to a μL/min level, which increases the ionization efficiency by increasing charging efficiency or facilitating the solvent removal.

Small-diameter pipes having an outer diameter of several hundred micrometers and an inner diameter of several tens of micrometers are used in the nano-ESI and the micro-ESI. For those pipes, material, fused silica, for example, having characteristics of easy microfabrication and low substance-adsorption property is used.

The eluate flowing through the pipe made of fused silica cannot be charged because the fused silica is an insulator. Conventionally, a couple of ESI sprayer semi-pipes are inserted into a connection member made of a conductive material from both ends of the connection member with the both ends of the semi-pipes separated from each other inside of the connection member, and a high voltage is applied to the connection member to charge the eluate in the separated portion of the semi-pipes.

FIG. 1 illustrates a configuration of a pipe connecting jig 300 of an ESI sprayer described in Patent Literature 1. The pipe connecting jig 300 connects an inlet-side pipe 301 and an outlet-side pipe 302 of the ESI sprayer, and includes a connection and fixing member 303 and a holder 304. The connection and fixing member 303 is a cylindrical member made of an elastic and conductive material (such as a conductive polymer), and has an inner diameter corresponding to the outer diameters of the inlet-side pipe 301 and the outlet-side pipe 302. The holder 304 is a prismatic member constructed with a holder main body 304a and a holder cover 304b, and a prismatic hole in which the connection and fixing member 303 is accommodated is made in the holder 304.

In using the pipe connecting jig 300, first the inlet-side pipe 301 is inserted from one end of the connection and fixing member 303. Subsequently, the outlet-side pipe 302 is inserted from the other end such that a gap (connection gap) is formed between an end face of the outlet-side pipe 302 and an end face of the inlet-side pipe 301. The connecting and fixing member 303 into which the inlet-side pipe 301 and the outlet-side pipe 302 are inserted is accommodated in the prismatic hole of the holder main body 304a. In measuring the sample, the eluate from the column is introduced from the inlet-side pipe 301 while the high voltage is applied to the connection and fixing member 303, and the eluate is charged through the connection gap formed in the connection and fixing member 303.

In the pipe connecting jig 300 described in Patent Literature 1, when the inlet-side pipe 301 and the outlet-side pipe 302 are connected to each other, the length of the connection gap formed between the end faces of both the pipes depends on the depths of insertion of the pipes. As described above, because the eluate from the column is charged through the connection gap, a variation in the length of the connection gap causes a variation in the charge efficiency of the eluate, which results in a problem in that ion production efficiency varies and a stable analysis result is hardly obtained.

Non Patent Literature 1 describes a pipe connecting union 400 that can set the length of the connection gap formed between the inlet-side pipe and the outlet-side pipe constant (as illustrated in FIG. 2). A through hole is formed inside the pipe connecting union 400, in which both ends of the through hole are straight and then tapered toward a small-diameter center portion. A ring-shaped protrusion 402 projecting from the outer circumference is provided in the center portion. Screws (female screws) 401 are formed on the inner circumference of the straight portions at both ends of the through hole.

When an inlet-side pipe 421 and an outlet-side pipe 422 are connected using the union 400, a fitting member 410 having an outer shape corresponding to the straight portion and the tapered portion is attached to the inlet-side pipe 421 and the outlet-side pipe 422, a screw 411 provided on the outer circumference of the straight portion of the fitting member 410 is screwed into the inner circumferential screw 401 of the union 400, and the leading end of the fitting member 410 is pressed against the protrusion 402. In the union 400, a space inside the protrusion 402 constitutes the connection gap, the space being formed between the inlet-side pipe 421 and the outlet-side pipe 422. Because the size of the space is fixed, the effluent can be charged and ionized with stable efficiency.

CITATION LIST

Patent Literature

Patent Literature 1: JP 2015-14616 A

Non Patent Literature

Non Patent Literature 1: "Connector Adapter Union", [online], MS Equipment Co., Ltd., [Search on Aug. 9, 2017], Internet.

SUMMARY OF THE INVENTION

Technical Problem

In order to connect the pipes using the union described in Non Patent Literature 1, it is necessary to attach the fitting member 410 in which the outer circumferential screw (male screw) 411 to be screwed with the inner circumferential screw (female screw) 401 of the union 400 is formed to the inlet-side pipe 421 and the outlet-side pipe 422. That is, in the union 400 described in Non-Patent Literature 1, because the inlet-side pipe 421 and the outlet-side pipe 422 are indirectly connected with the fitting member 410 interposed therebetween, the number of components is increased, and the outer diameter of the connecting point of both the pipes is increased, which results in a problem in that the ESI sprayer is enlarged.

The problem to be solved by the present invention is to provide an ESI sprayer including a pipe connecting jig that can connect the two pipes without attaching an additional jig, and charge the liquid passing through the pipe with stable efficiency when the voltage is applied to the liquid.

Solution to Problem

One aspect of the present invention for solving the above problem is an ESI sprayer comprising: an inlet-side pipe and an ESI capillary made of an insulator; and a pipe connecting jig wherein a through-hole having an inner diameter corresponding to an outer diameter of the inlet-side pipe at one end and an inner diameter corresponding to an outer diameter of the ESI capillary at another end is formed in an axial direction of a conductive cylindrical body, a gap forming protrusion protruding inward from a circumferential wall of the through-hole is provided in the cylindrical body, and both ends are plastically deformed.

When the first pipe and the second pipe are connected using the pipe connecting jig, the first pipe and the second pipe are inserted from both the ends of the pipe connecting jig until the leading ends of the first pipe and the second pipe reach the protrusion. Both the ends of the pipe connecting jig are plastically deformed so as to be pressed against the first pipe and the second pipe. Consequently, the first pipe and the second pipe are connected while inserted into the pipe connecting jig. When the pipe connecting jig is used, the two pipes can be connected without attaching or using another jig. Because the positions of the end faces of both the pipes are defined by the gap forming protrusion, the length of the gap (connection gap) formed between the end faces is kept constant. Thus, when the high voltage is applied to the pipe connecting jig, the liquid passing through the gap (connection gap) can be charged with stable efficiency.

Preferably, the gap forming protrusion is formed in a ring shape.

In the pipe connecting jig of this aspect, when the first pipe and the second pipe are inserted into the pipe connecting jig, the entire end faces of the first pipe and the second pipe abut on the ring-shaped gap forming protrusion. Therefore, a possibility that a force is locally applied to the gap forming protrusion and the gap forming protrusion is deformed to change the length of the connection gap between the end faces of both the pipes, is reduced.

Preferably, the pipe connecting jig is a ferrule having a tapered shape toward both ends.

When the pipe connecting jig of this aspect is used, both the ends of the pipe connecting jig can plastically be deformed with smaller force compared with the case where a pipe connecting jig having a cylindrical shape or the like is used. For this reason, the possibility of damaging the first pipe and the second pipe, or the possibility of crushing the internal space of the gap forming protrusion to reduce the inner diameter of the gap forming protrusion is reduced when both the ends of the pipe connecting jig are plastically deformed.

Preferably, the pipe connecting jig further includes a pipe diameter adjusting jig for attaching to a pipe having a diameter smaller than the inner diameter of the through-hole.

According to this configuration, one pipe connecting jig can be used to connect pipes having different outer diameters. Further, an extremely thin, fragile pipe, such as a capillary, can be protected.

Advantageous Effects of Invention

Using the ESI sprayer of the present invention, the two pipes can be connected to each other without attaching or using an additional jig, and the liquid passing through the pipe can be charged with stable efficiency when the voltage is applied to the liquid.

BRIEF DESCRIPTION OF THE DRAWINGS

FIG. 6 is a view illustrating a state in which the ESI sprayer is attached to the liquid chromatograph mass spectrometer of the example embodiment.

DETAILED DESCRIPTION

Figure 1:
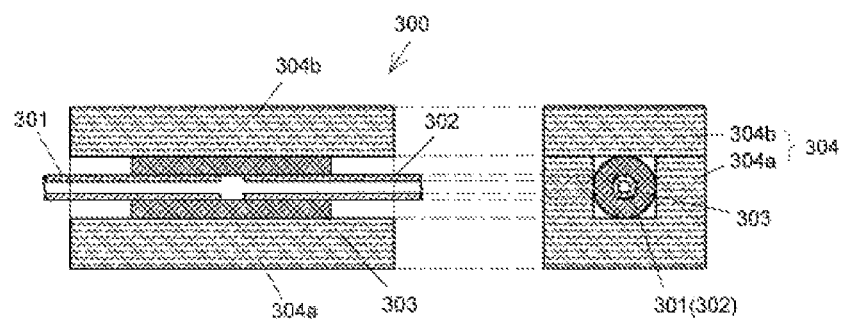
FIG. 1 is a view illustrating a configuration of a conventional pipe connecting jig.
Figure 2:
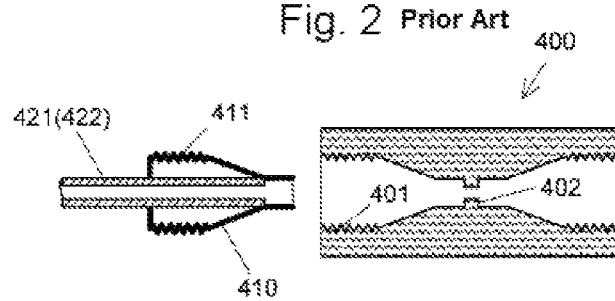
FIG. 2 is another view illustrating the configuration of the conventional pipe connecting jig.
Figure 3:
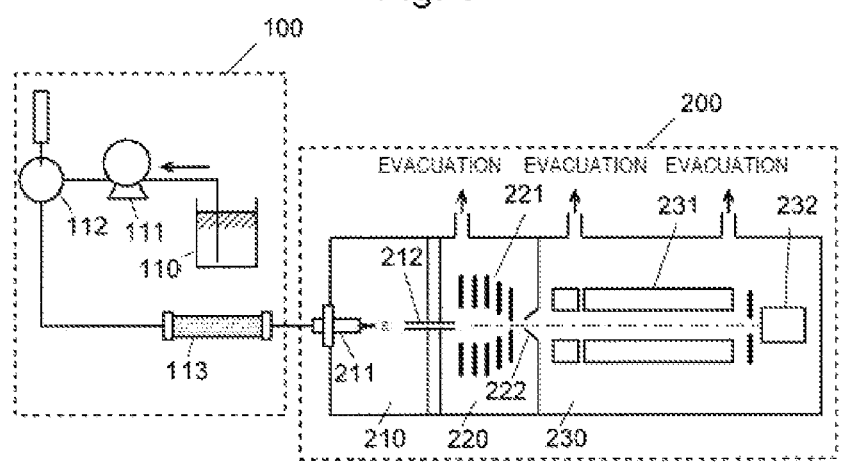
FIG. 3 is a configuration diagram illustrating a main part of an entire liquid chromatograph mass spectrometer in which an ESI sprayer according to an example embodiment of the present invention is used.

An ESI sprayer according to an example embodiment of the present invention will be described below with reference to the drawings. The pipe connecting jig of the example embodiment is used to connect pipes of an ESI sprayer in a liquid chromatograph mass spectrometer. FIG. 3 illustrates a configuration of a main part in the liquid chromatograph mass spectrometer of the example embodiment.

The liquid chromatograph mass spectrometer of the example embodiment roughly includes a liquid chromatograph 100 and a mass spectrometer 200. An operation of each unit is controlled by a controller (not illustrated). The liquid chromatograph 100 includes a mobile phase container 110 in which a mobile phase is stored, a pump 111 that sucks the mobile phase and delivers the mobile phase at a constant flow rate, an injector 112 that injects a predetermined amount of a liquid sample into the mobile phase, and a column 113 that separates various compounds contained in the liquid sample in a time direction, and a column oven (not illustrated) that controls a temperature of the column 113. The liquid chromatograph 100 also includes an autosampler (not illustrated) that introduces a plurality of liquid samples into the injector 112 one by one.

The mass spectrometer 200 has a configuration of a differential evacuation system including an ionization chamber 210 that is at a substantially atmospheric pressure, an intermediate vacuum chamber 220 evacuated by a vacuum pump (not illustrated), and an analysis chamber 230 in high vacuum. An electrospray ionization probe (ESI probe) 211 that nebulizes a sample solution while applying a charge to the sample solution is provided in the ionization chamber 210. The ionization chamber 210 and the subsequent-stage intermediate vacuum chamber 220 communicate with each other through a small-diameter heated capillary 212. An ion guide 221 that transports ions to the subsequent stage while converging the ions in the intermediate vacuum chamber 220, and the intermediate vacuum chamber 220 and the analysis chamber 230 are separated from each other by a skimmer 222 including a small hole at the top. A quadrupole mass filter 231 and an ion detector 232 are installed in the analysis chamber 230. In the example embodiment, the mass spectrometer has a simple quadrupole type configuration. Alternatively, a mass spectrometer having another configuration (e.g. a triple quadrupole type or an ion trap-time-of-flight type) can be used.

The mass spectrometer 200 can perform SIM (selected ion monitoring) measurement and MS scan measurement. In the SIM measurement, ions are detected while a mass-to-charge ratio of ions passing through the quadrupole mass filter 231 is fixed. In the MS scan measurement, ions are detected while the mass-to-charge ratio of ions passing through the quadrupole mass filter 231 is scanned.

Figure 4:
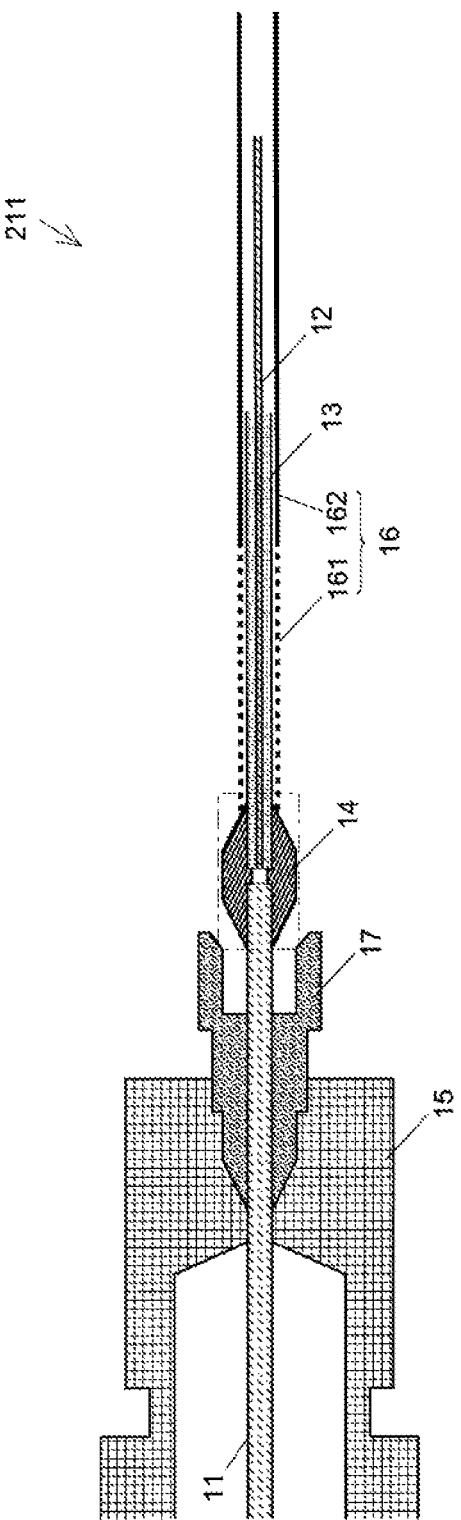
FIG. 4 is a view illustrating a configuration of an ESI sprayer of the liquid chromatograph mass spectrometer of the example embodiment.

FIG. 4 illustrates a configuration of the ESI sprayer 211 that is an ion source of the liquid chromatograph mass spectrometer. The ESI sprayer 211 is used to spray a liquid eluted from the column 113 of the liquid chromatograph 100 into the ionization chamber 210 as charged droplets. The pipe of the ESI sprayer 211 is divided into an inlet-side pipe 11 and an ESI capillary (outlet-side pipe) 12. The inlet-side pipe 11 is a pipe made of a polyether ether ketone resin (PEEK), and the ESI capillary 12 is a pipe made of fused silica. These are insulators. These materials are examples, and the pipes made of other insulators can be used.

The ESI capillary 12 is the pipe having a diameter smaller than that of the inlet-side pipe 11, and a protective tube 13 having the same outer diameter as that of the inlet-side pipe 11 is attached to an outer circumference of the ESI capillary 12. The protective tube 13 is also a pipe made of a polyether ether ketone resin (PEEK). The inlet-side pipe 11 and the ESI capillary 12 to which the protective tube 13 is attached are connected to each other by the pipe connecting jig 14 of the example embodiment. The ESI sprayer 211 includes a first connection member 15 attaching the ESI sprayer 211 to a housing of the mass spectrometer 200 and a second connection member 17 fixing the inlet-side pipe 11 to the first connection member 15. A protective member 16 constructed with a spring 161 and a sheath unit 162 is attached to the outer circumference of the ESI capillary 12, and one end of the spring 161 is attached to the pipe connecting jig 14. When the ESI sprayer 211 is not used (when the ESI sprayer 211 is not installed in the mass spectrometer 200), the sheath unit 162 covers a leading end of the ESI capillary 12 so as to protect the leading and of the ESI capillary 12.

Figure 5:
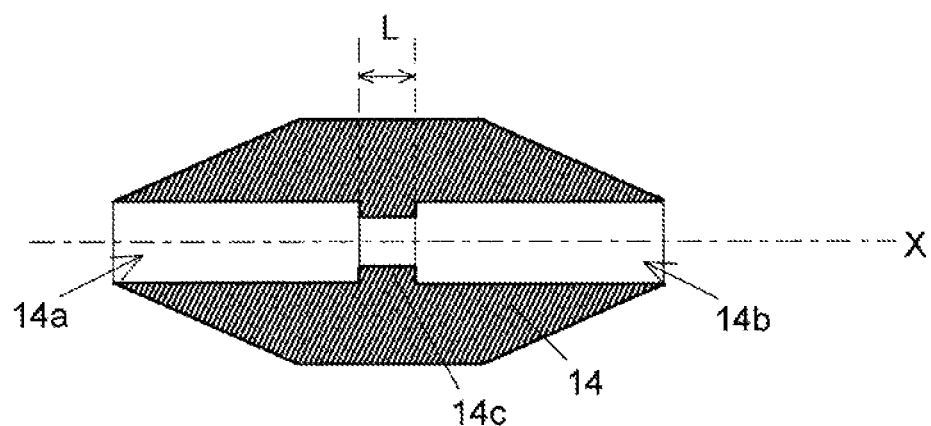
FIG. 5 is a view illustrating a structure of a pipe connecting jig of the example embodiment.

As illustrated in FIG. 5, the pipe connecting jig 14 has a cylindrical body in which both ends are tapered (ferrule shape), and a through-hole (an inlet-side pipe insertion hole 14a, an outlet-side pipe insertion hole 14b) having an inner diameter corresponding to the outer diameters of the inlet-side pipe 11 and the protective tube 13 is formed in the pipe connecting jig 14, the through-hole including a center axis X parallel to an axial direction of the cylindrical body. Further, a ring-shaped gap forming protrusion 14c having a length L is provided at a boundary between the inlet-side pipe insertion hole 14a and the outlet-side pipe insertion hole 14b in the cylindrical body, the gap forming protrusion 14c protruding inward from a circumferential wall of the cylindrical body. The pipe connecting jig 14 and the protective member 16 (the spring 161 and the sheath unit 162) of the example embodiment are made of stainless steel (SUS). Alternatively, the pipe connecting jig 14 and the protective member 16 can be made of other conductive materials.

In using the pipe connecting jig 14 of the example embodiment, the inlet-side pipe 11 is inserted into the inlet-side pipe insertion hole 14a, and the leading end of the inlet-side pipe 11 abuts on the gap forming protrusion 14c. The ESI capillary 12 to which the protective tube 13 is attached is inserted into the outlet-side pipe insertion hole 14b, and the leading end of the ESI capillary 12 abuts on the gap forming protrusion 14c. Both the ends of the pipe connecting jig 14 are respectively pressed against the inlet-side pipe 11 and the protective tube 13 using a coupling and a ferrule, and the both the ends are plastically deformed. Consequently, the inlet-side pipe 11 and the ESI capillary 12 are connected with a connection gap interposed therebetween, the connection gap corresponding to the length L of the gap forming protrusion 14c.

In the pipe connecting jig 14 of the example embodiment, the gap forming protrusion 14c is formed in the ring shape, and the leading ends of the inlet-side pipe 11 and the ESI capillary 12 contact circumferentially with the inlet-side pipe insertion hole 14a and the outlet-side pipe insertion hole 14b when the inlet-side pipe 11 and the ESI capillary 12 (and the protective tube 13) are inserted into the inlet-side pipe insertion hole 14a and the outlet-side pipe insertion hole 14b, respectively. Therefore, a force is locally applied between the gap forming protrusion 14c and the leading end to deform the gap forming protrusion 14c, and a possibility of changing the length of the connection gap and the inner diameter of the pipe is reduced. In the example embodiment, both the ends are deformed by using the coupling and the ferrule because the pipe connecting jig 14 is made of SUS. Alternatively, when the pipe connecting jig 14 is made of a material softer than SUS, a user can press both the ends against both the pipes by hand.

The ESI sprayer 211 in which the inlet-side pipe 11 and a passage of the ESI capillary 12 are connected as described above is installed in the housing of the mass spectrometer 200. FIG. 6 illustrates a configuration of a portion of the ESI sprayer 211 installed in the mass spectrometer 200.

In the housing of the mass spectrometer 200, a leading end member 21, an ESI capillary accommodating member 22, an ESI sprayer main body accommodating member 23, and an ESI sprayer attaching member 24 are arranged in this order from the leading end side of the ESI sprayer 211.

The leading end member 21 is a member having a leading end formed in a cone shape and an opening formed at the top, and a slight gap is formed between the leading end member 21 and the leading end of the ESI capillary 12. A nebulizer gas (to be described later) is delivered from the gap, and a charged droplet is sprayed. A sheath unit contact surface 22a is formed on the inner wall surface of the ESI capillary accommodating member 22, the leading end of the sheath unit 162 abuts on the sheath unit contact surface 22a when the ESI sprayer 211 is inserted, and the ESI capillary 12 is exposed from the sheath unit 162 when the ESI sprayer 211 is further inserted. After the ESI sprayer 211 is inserted into a predetermined position, the ESI sprayer 211 is finally fixed to the ESI sprayer attaching member 24 with a bolt 31.

The ESI capillary accommodating member 22 is made of a conductive material, and a high voltage (ESI voltage) is applied to the pipe connecting jig 14 through the sheath unit 162 and the spring 161 when the high voltage is applied from the voltage applying unit 40 to the ESI capillary accommodating member 22 while the ESI sprayer 211 is inserted. In many cases, a partition wall of the ionization chamber 210 and the intermediate vacuum chamber 220 in which the ion introduction opening is formed is grounded, and the ESI voltage having a predetermined potential with regard to the grounding portion is applied. The liquid passing through the connection gap in the gap forming protrusion 14c is charged due to the ESI voltage.

A nebulizer gas passage 24a is formed in the ESI sprayer attaching member 24. The nebulizer gas such as a nitrogen gas is supplied from the nebulizer gas supply unit 50 into the housing through the nebulizer gas passage 24a. The nebulizer gas supplied into the housing reaches the leading end of the ESI sprayer 211 through a space of the outer circumference of the ESI sprayer 211, and is ejected from the opening of the leading end member 21. The nebulizer gas is sprayed to the charged liquid sample delivered from the ESI capillary 12, and the charged droplets are sprayed into the ionization chamber 210. The sprayed charged droplets are desolvated and ionized in the ionization chamber 210, pass through the heating capillary 212, sequentially enter the intermediate vacuum chamber 220 and the analysis chamber 230, and are subjected to analysis.

As described above, when the pipe connecting jig 14 of the example embodiment is used, the inlet-side pipe 11 and the ESI capillary 12 can be connected with no use of another jig or the like. Because the positions of the end faces of the inlet-side pipe 11 and the ESI capillary 12 are defined by the gap forming protrusion 14c, the length L of the gap (connection gap) formed between the end faces is kept constant. Thus, when the high voltage is applied to the ESI capillary accommodating member 22 and applied to the pipe connecting jig 14 through the sheath unit 162 and the spring 161, the liquid sample passing through the gap (connection gap) can be charged with stable efficiency.

In the example embodiment, the gap forming protrusion 14c is formed in the ring shape, and the entire end faces of the inlet-side pipe 11 and the ESI capillary 12 abuts on the ring-shaped gap forming protrusion 14c when the inlet-side pipe 11 and the ESI capillary 12 (with the protective tube 13 attached) are inserted into the gap forming protrusion 14c. Therefore, the possibility that the gap forming protrusion 14c is deformed to damage the end faces of the inlet-side pipe 11 and the ESI capillary 12 by locally applying the force to the gap forming protrusion 14c, and the possibility that the force is locally applied to the gap forming protrusion 14c to change the connection gap between the inlet-side pipe 11 and the ESI capillary 12 are reduced.

The pipe connecting jig 14 of the example embodiment has the tapered shape toward both the ends. That is, both the ends of the pipe connecting jig 14 have the ferrule-shaped, so that both the ends can plastically be deformed with a smaller force than that of the case where a pipe connecting jig having a cylindrical shape or the like is used. Therefore, a possibility of damaging the inlet-side pipe 11 and the ESI capillary 12, and a possibility of crushing the internal space of the gap forming protrusion 14c to reduce the inner diameter of the gap forming protrusion 14c are reduced when both the ends of the pipe connecting jig 14 are plastically deformed.

The pipe connecting jig 14 of the example embodiment includes the protective tube 13 attached to the ESI capillary 12 having the diameter smaller than that of the inlet-side pipe 11. When a plurality of types having different inner diameters are previously prepared as the protective tube 13, the protective tube 13 having the appropriate inner diameter corresponding to the outer diameter of the outlet-side pipe is used, and one pipe connecting jig 14 can be used to connect the pipes having different outer diameters. The use of the protective tube 13 can protect an extremely thin, fragile pipe such as the ESI capillary 12 of the example embodiment.

In the example embodiment, the inlet-side pipe insertion hole 14a and the outlet-side pipe insertion hole 14b have the same inner diameter. Alternatively, the inlet-side pipe insertion hole 14a and the outlet-side pipe insertion hole 14b can have the different inner diameters. A plurality of pipe connecting jigs in which the inner diameters of the inlet-side pipe insertion hole 14a and the outlet-side pipe insertion hole 14b are different from each other are previously prepared, and the jig for pipe connecting jig can be used according to the outer diameter of the inlet-side pipe and the outlet-side pipe to be connected to each other. A plurality of pipe connecting jigs having same inner diameter as the diameter of the inlet-side pipe insertion hole 14a and the outlet-side pipe insertion hole 14b and different lengths of the gap forming protrusions 14c are previously prepared, and the liquid sample can be charged with a connection gap having the appropriate length according to the ease of charging of the liquid sample and the ionization efficiency of the components contained in the sample.

The above example embodiment is merely an example, and can appropriately be changed according to the spirit of the present invention. In the example embodiment, the inlet-side pipe 11 and the ESI capillary 12 of the ESI sprayer 211 are connected to each other. However, the inlet-side pipe 11 of the ESI sprayer 211 and the outlet-side pipe of the column 113 of the liquid chromatograph 100 can also be used using the pipe connecting jig 14. In the example embodiment, the ESI sprayer 211 included in the mass spectrometer of the liquid chromatograph mass spectrometer is described. However, an ESI sprayer similar to the example embodiment can be used as an ionizer of various ion analyzers (such as an ion mobility analyzer and a classifier).

REFERENCE SIGNS LIST

11 . . . Inlet-Side Pipe
12 . . . ESI Capillary (Outlet-Side Pipe)
13 . . . Protective Tube
14 . . . Pipe Connecting Jig
14a . . . Inlet-Side Pipe Insertion Hole
14b . . . Outlet-Side Pipe Insertion Hole
14c . . . Gap Forming Protrusion
15 . . . First Connection Member
16 . . . Protective Member 161 . . . Spring
162 . . . Sheath Unit
17 . . . Second Connection Member
21 . . . Leading End Member
22 . . . ESI Capillary Accommodating Member
23 . . . ESI Sprayer Main Body Accommodating Member
24 . . . ESI Sprayer Attaching Member
31 . . . Bolt
40 . . . Voltage Applying Unit
50 . . . Nebulizer Gas Supply Unit
100 . . . Liquid Chromatograph
200 . . . Mass Spectrometer
210 . . . Ionization Room
211 . . . ESI Sprayer

The invention claimed is:

1. An ESI sprayer comprising:
an inlet-side pipe and an ESI capillary each made of an insulator; and
a pipe connecting jig,
wherein a through-hole having an inner diameter corresponding to an outer diameter of the inlet-side pipe at one end, and an inner diameter corresponding to an outer diameter of the ESI capillary at another end, is formed in an axial direction of a conductive cylindrical body, wherein a gap forming protrusion protruding inward from a circumferential wall of the through-hole is provided in the cylindrical body, and both ends are plastically deformed.

2. The ESI sprayer according to claim 1, wherein the gap forming protrusion is formed in a ring shape.

3. The ESI sprayer according to claim 1, wherein the pipe connecting jig has a tapered shape toward both ends.

4. The ESI sprayer according to claim 1, further comprising:
a pipe diameter adjusting jig attached to a pipe having a diameter smaller than the inner diameter of the through-hole.

5. The ESI sprayer according to claim 1, further comprising:
a voltage applying unit configured to apply a voltage to the pipe connecting jig.

6. The ESI sprayer according to claim 1, wherein at least one of the inlet-side pipe and the ESI capillary is made of fused silica.

7. A method for connecting an inlet-side pipe and an ESI capillary of an ESI sprayer by a pipe connecting jig, wherein a through-hole having an inner diameter corresponding to an outer diameter of the inlet-side pipe at one end, and an inner diameter corresponding to an outer diameter of the ESI capillary at another end, is formed in an axial direction of a conductive cylindrical body, and wherein a gap forming protrusion protruding inward from a circumferential wall of the through-hole is provided in the cylindrical body, the method comprising:
inserting the inlet-side pipe from the one end so that a leading end of the inlet-side pipe abuts the gap forming protrusion;
inserting the ESI capillary from the other end so that a leading end of the ESI capillary abuts the gap forming protrusion; and
plastically deforming both ends of the pipe connecting jig.

8. The ESI sprayer according to claim 3, wherein the tapered shape tapers inwardly in a direction away from the gap forming protrusion.

* * * * *